(12) United States Patent
Leduc et al.

(10) Patent No.: US 8,381,816 B2
(45) Date of Patent: Feb. 26, 2013

(54) FLUSHING PROCEDURE FOR ROTATING CONTROL DEVICE

(75) Inventors: Trung Leduc, Houston, TX (US); Huward Paul Fontenot, Spring, TX (US); Alberto Zubia, Houston, TX (US); Robert James Costo, The Woodlands, TX (US)

(73) Assignee: Smith International, Inc., Houston, TX (US)

( * ) Notice: Subject to any disclaimer, the term of this patent is extended or adjusted under 35 U.S.C. 154(b) by 347 days.

(21) Appl. No.: 12/716,921

(22) Filed: Mar. 3, 2010

(65) Prior Publication Data

US 2011/0214871 A1 Sep. 8, 2011

(51) Int. Cl.
*E21B 21/00* (2006.01)
*E21B 17/10* (2006.01)
*E21B 33/00* (2006.01)

(52) U.S. Cl. ..... 166/311; 166/85.3; 166/84.4; 166/84.3; 166/82.1; 166/344; 175/195

(58) Field of Classification Search .................. 166/311, 166/157, 381, 85.3, 84.4, 84.3, 82.1, 339, 166/340, 344, 345, 347; 175/195
See application file for complete search history.

(56) References Cited

U.S. PATENT DOCUMENTS

| | | | |
|---|---|---|---|
| 3,967,678 A * | 7/1976 | Blackwell | 166/53 |
| 4,673,041 A * | 6/1987 | Turner et al. | 166/340 |
| 5,005,650 A * | 4/1991 | Hopper | 166/339 |
| 5,022,472 A | 6/1991 | Bailey et al. | |
| 5,526,877 A * | 6/1996 | Winz | 166/88.2 |
| 6,354,385 B1 | 3/2002 | Ford et al. | |
| 2002/0121373 A1* | 9/2002 | Patel | 166/250.08 |
| 2008/0105462 A1* | 5/2008 | May et al. | 175/7 |

FOREIGN PATENT DOCUMENTS

GB 2443561 A 5/2008

OTHER PUBLICATIONS

Examination Report issued in corresponding British Application No. GB1103672.0; Dated Mar. 19, 2012 (1 page).
Combined Search and Examination Report issued in corresponding British Patent Application No. GB1103672.0; Dated Mar. 24, 2011 (6 pages).

* cited by examiner

*Primary Examiner* — Cathleen Hutchins
(74) *Attorney, Agent, or Firm* — Osha Liang LLP (57) ABSTRACT

A method of flushing a wellbore fluid from a downhole tool containing a bearing package includes pumping hydraulic oil through at least one of a hydraulic inlet line and at least one of a pneumatic inlet line connected to the main housing and into an annulus formed between the bearing package and a main housing of the downhole tool, wherein the hydraulic oil replaces the wellbore fluid in the annulus, removing the wellbore fluid from the annulus through at least one hydraulic outlet line and at least one pneumatic outlet line connected to the main housing, pumping air through the at least one pneumatic inlet line connected to the main housing and removing the hydraulic oil from the at least one pneumatic inlet line connected to the main housing, and removing the hydraulic oil through at least one pneumatic outlet line connected to the main housing.

15 Claims, 11 Drawing Sheets

FLUSHING PROCEDURE FOR ROTATING CONTROL DEVICE

BACKGROUND

1. Field of the Disclosure

The present disclosure generally relates to apparatus and methods for managed pressure drilling. More particularly, the present disclosure relates to apparatus and methods to drill subsea wellbores offshore through drilling risers in managed pressure drilling operations. More particularly still, the present disclosure relates to apparatus and methods including rotating control devices having packing elements retrievable through upper portions of drilling risers.

2. Background Art

Wellbores are drilled deep into the earth's crust to recover oil and gas deposits trapped in the formations below. Typically, these wellbores are drilled by an apparatus that rotates a drill bit at the end of a long string of threaded pipes known as a drillstring. Because of the energy and friction involved in drilling a wellbore in the earth's formation, drilling fluids, commonly referred to as drilling mud, are used to lubricate and cool the drill bit as it cuts the rock formations below. Furthermore, in addition to cooling and lubricating the drill bit, drilling mud also performs the secondary and tertiary functions of removing the drill cuttings from the bottom of the wellbore and applying a hydrostatic column of pressure to the drilled wellbore.

Typically, drilling mud is delivered to the drill bit from the surface under high pressures through a central bore of the drillstring. From there, nozzles on the drill bit direct the pressurized mud to the cutters on the drill bit where the pressurized mud cleans and cools the bit. As the fluid is delivered downhole through the central bore of the drillstring, the fluid returns to the surface in an annulus formed between the outside of the drillstring and the inner profile of the drilled wellbore. Because the ratio of the cross-sectional area of the drillstring bore to the annular area is relatively low, drilling mud returning to the surface through the annulus do so at lower pressures and velocities than they are delivered. Nonetheless, a hydrostatic column of drilling mud typically extends from the bottom of the hole up to a bell nipple of a diverter assembly on the drilling rig. Annular fluids exit the bell nipple where solids are removed, the mud is processed, and then prepared to be re-delivered to the subterranean wellbore through the drillstring.

As wellbores are drilled several thousand feet below the surface, the hydrostatic column of drilling mud serves to help prevent blowout of the wellbore as well. Often, hydrocarbons and other fluids trapped in subterranean formations exist under significant pressures. Absent any flow control schemes, fluids from such ruptured formations may blow out of the wellbore like a geyser and spew hydrocarbons and other undesirable fluids (e.g., $H_2S$ gas) into the atmosphere. As such, several thousand feet of hydraulic "head" from the column of drilling mud helps prevent the wellbore from blowing out under normal conditions.

However, under certain circumstances, the drill bit will encounter pockets of pressurized formations and will cause the wellbore to "kick" or experience a rapid increase in pressure. Because formation kicks are unpredictable and would otherwise result in disaster, flow control devices known as blowout preventers ("BOPs"), are mandatory on most wells drilled today. One type of BOP is an annular blowout preventer. Annular BOPs are configured to seal the annular space between the drillstring and the inside of the wellbore. Annular BOPs typically include a large flexible rubber packing unit of a substantially toroidal shape that is configured to seal around a variety of drillstring sizes when activated by a piston. Furthermore, when no drillstring is present, annular BOPs may even be capable of sealing an open bore. While annular BOPs are configured to allow a drillstring to be removed (i.e., tripped out) or inserted (i.e., tripped in) therethrough while actuated, they are not configured to be actuated during drilling operations (i.e., while the drillstring is rotating). Because of their configuration, rotating the drillstring through an activated annular blowout preventer would rapidly wear out the packing element.

As such, rotary drilling heads are frequently used in oilfield drilling operations where elevated annular pressures are present. A typical rotary drilling head includes a packing element and a bearing package, whereby the bearing package allows the packing element to rotate along with the drillstring. Therefore, in using a rotary drilling head, there is no relative rotational movement between the packing element and the drillstring, only the bearing package exhibits relative rotational movement. Examples of rotary drilling heads include U.S. Pat. No. 5,022,472 issued to Bailey et al. on Jun. 11, 1991, assigned to Drilex Systems, Inc., and U.S. Pat. No. 6,354,385 issued to Ford et al. on Mar. 12, 2002, assigned to the assignee of the present application, and both hereby incorporated by reference herein in their entirety.

When the pressure of the hydrostatic column of drilling mud is less than the formation pressure, the drilling operation is said to be experiencing an "underbalanced" condition. While running an underbalanced drilling operation, there is increased risk that the excess formation pressure may cause a blowout in the well. Similarly, when the pressure of the hydrostatic column exceeds the formation pressure, the drilling operation is said to be experiencing an "overbalanced" condition. While running an overbalanced drilling operation, there is increased risk that the drilling fluids may invade the formation, resulting in loss of annular return pressure, and the loss of expensive drilling fluids to the formation. Therefore, under most circumstances, drilling operations are desired to be either balanced operations or slightly underbalanced or overbalanced operations.

In certain drilling circumstances, the pressures contained within the drilled formation are elevated. One mechanism to counter such elevated pressures is to use a higher specific gravity drilling mud. By using such a "heavier" mud, the same height column may be able to resist and "balance" a higher formation pressure. However, there are drawbacks to using a heavy drilling mud. For one, heavier mud is more difficult to pump down through the drill bit at high pressures, and may result in premature wear of pumping and flow control equipment. Further, heavier mud may be more abrasive on drilling fluid nozzles and other flowpath components, resulting in premature wear to drill bits, mud motors, and MWD telemetry components. Furthermore, heavier mud may also not be as effective at cooling and removing cuttings away from drill bit cutting surfaces.

One alternative to drilling in formations having elevated pressure formations is known as managed pressure drilling ("MPD"). In managed pressure drilling, the annulus of the wellbore is capped and the release of returning drilling mud is regulated such that increased annular pressures may result. In an MPD operation, it is not uncommon to increase the annular return pressure, and thus the hydrostatic head opposing the formation pressure, by 500 psi or more to achieve the balanced, underbalanced, or overbalanced drilling condition desired. By using a rotary drilling head having a regulated annular output, formation pressures may be more effectively isolated to maximize drilling rate of penetration.

While MPD operations are relatively simple operations to perform on land, they become considerably more difficult and complex when dealing with offshore drilling operations. Typically, an offshore drilling operation undertakes to drill a wellbore from a subsea wellhead installed on a sea floor. Typically, depending on the depth of water in which the operations are to be carried out, a long string of connected pipe sections known as a riser extends from the subsea wellhead to the drilling rig at the surface. Under normal operations, a drillstring may extend from the drilling rig, through the riser and to the wellbore through the subsea wellhead as if the riser sections are a mere extension of the wellbore itself. However, in various subsea locations, particularly in very deep water, formation pressures of undersea hydrocarbon deposits may be extraordinarily high. As such, to avoid extreme underbalanced conditions while drilling in deep water, MPD operations are increasingly becoming important for offshore drilling rigs.

Drawbacks to performing operations with former offshore rigs include the elevated pressures associated with MPD operations. Particularly, various components (e.g., slip joints, diverter assemblies, etc.) of the upper portion of riser assemblies are not designed to survive the elevated pressures of MPD operations. One solution produced by Williams Tool Company, Inc. is known as the RiserCap™ rotating control head system. In this system, the upper portion of the riser assembly is removed and a rotary drilling head-type apparatus is installed. Once installed, MPD operations may proceed with the exposed drillstring engaging the top of the RiserCap™ assembly (located below the rig floor) and extending into the lower riser assembly. The rotating head assembly of the RiserCap™ isolates the high-pressure annular fluids from the atmosphere and diverts them through a discharge manifold. When MPD operations are to cease, an annular BOP is engaged, the RiserCap™ assembly is removed, and the upper portion of the former riser assembly is replaced.

One issue with the RiserCap™ system marketed by Williams Tool Company, Inc. is that a significant amount of time and labor is required each time an MPD operation is called for. Because the upper portion of the drilling riser including the diverter assembly and slip joint is often removed, the RiserCap™ system is not practical for non-MPD operations. As such, hours of rig time to set-up and subsequently dismantle the RiserCap™ system must be budgeted for each MPD operation. Furthermore, significant rig storage space, always at a premium on offshore rigs, must be devoted to storing the RiserCap™ system and all the tooling and support components associated therewith.

As such, embodiments of the present disclosure are directed to a riser assembly and method of use that enables both MPD and non-MPD operations to be performed with a single riser assembly. Particularly, the riser assembly disclosed allows for rapid switching between MPD and non-MPD operations without requiring complicated make-up and take-down operations to be performed on the riser. Furthermore, embodiments disclosed herein allow a pre-existing riser assembly to quickly and easily be converted to dual purpose MPD/non-MPD operation.

SUMMARY OF CLAIMED SUBJECT MATTER

In one aspect, embodiments disclosed herein relate to a method of flushing a wellbore fluid from a downhole tool containing a bearing package, the method including pumping hydraulic oil through at least one of a hydraulic inlet line and at least one of a pneumatic inlet line connected to the main housing and into an annulus formed between the bearing package and a main housing of the downhole tool, wherein the hydraulic oil replaces the wellbore fluid in the annulus, removing the wellbore fluid from the annulus through at least one hydraulic outlet line and at least one pneumatic outlet line connected to the main housing, pumping air through the at least one pneumatic inlet line connected to the main housing and removing the hydraulic oil from the at least one pneumatic inlet line connected to the main housing, and removing the hydraulic oil through at least one pneumatic outlet line connected to the main housing.

In other aspects, embodiments disclosed herein relate to a flushing system for removing a wellbore fluid from a downhole tool containing a bearing package, the flushing system including a flushing block into which a main hydraulic oil inlet line and a main air inlet line are routed, at least one hydraulic inlet line connected to a main housing of the downhole tool and at least one hydraulic outlet line connected to a main housing of the downhole tool, and at least one pneumatic inlet line connected to the main housing of the downhole tool and at least one pneumatic outlet line connected to the main housing of the downhole tool.

Other aspects and advantages will be apparent from the following description and the appended claims.

DETAILED DESCRIPTION

Selected embodiments of the present disclosure include a rotating control device and its use to isolate a lower portion of a drilling riser from an upper portion of a drilling riser. Particularly, the rotating control device may be useful in managed pressure drilling MPD operations where fluids in the annulus of the drilling riser are pressurized over their normal hydrostatic (i.e., their weight) pressure in an effort to more effectively control drilling conditions in a subsea well. In selected embodiments, the rotating control device enables a drillstring engaged therethrough to be rotated and tripped in or out of the wellbore while maintaining the seal between the upper portion and the lower portion of the drilling riser. Furthermore, selected embodiments of the present disclosure include a rotating control device whereby the seal apparatus thereof is retrievable therefrom without disconnecting any portion of the drilling riser.

Figure 1:
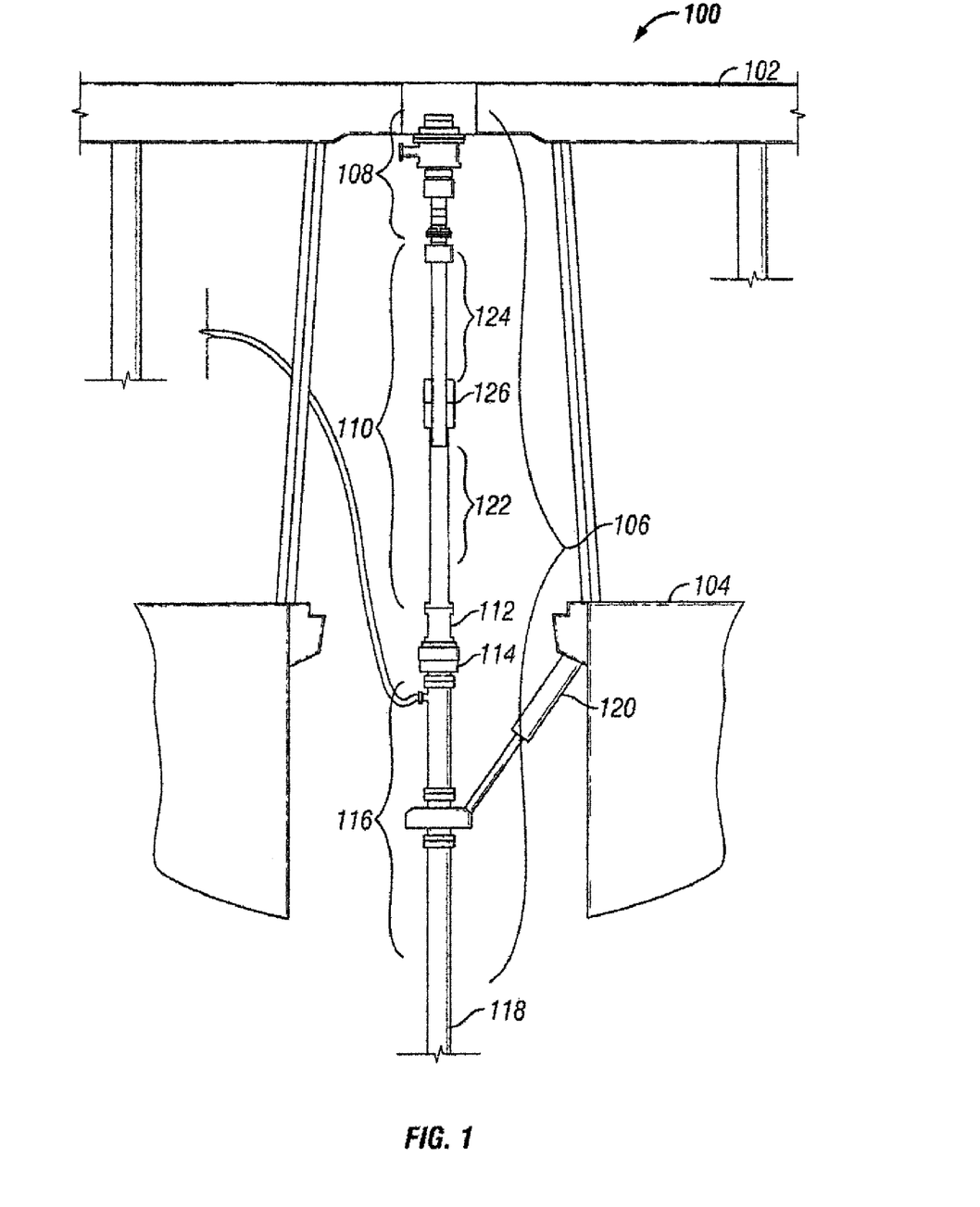
FIG. 1 depicts an offshore drilling platform in accordance with embodiments of the present disclosure.

Referring now to FIG. 1, a portion of an offshore drilling platform 100 is shown. While offshore drilling platform 100 is depicted as a semi-submersible drilling platform, one of ordinary skill will appreciate that a platform of any type may be used including, but not limited to, drillships, spar platforms, tension leg platforms, and jack-up platforms. Offshore drilling platform 100 includes a rig floor 102 and a lower bay 104. A riser assembly 106 extends from a subsea wellhead (not shown) to offshore drilling platform 100 and includes various drilling and pressure control components.

From top to bottom, riser assembly 106 includes a diverter assembly 108 (shown including a standpipe and a bell nipple), a slip joint 110, a rotating control device 112, an annular blowout preventer 114, a riser hanger and swivel assembly 116, and a string of riser pipe 118 extending to subsea wellhead (not shown). While one configuration of riser assembly 106 is shown and described in FIG. 1, one of ordinary skill in the art should understand that various types and configurations of riser assembly 106 may be used in conjunction with embodiments of the present disclosure. Specifically, it should be understood that a particular configuration of riser assembly 106 used will depend on the configuration of the subsea wellhead below, the type of offshore drilling platform 100 used, and the location of the well site.

Because offshore drilling platform 100 is a semi-submersible platform, it is expected to have significant relative axial movement (i.e., heave) between its structure (e.g., rig floor 102 and/or lower bay 104) and the sea floor. Therefore, a heave compensation mechanism must be employed so that tension may be maintained in riser assembly 106 without breaking or overstressing sections of riser pipe 118. As such, slip joint 110 may be constructed to allow 30', 40', or more stroke (i.e., relative displacement) to compensate for wave action experienced by drilling platform 100. Furthermore, a hydraulic member 120 is shown connected between rig floor 102 and hanger and swivel assembly 116 to provide upward tensile force to string of riser pipe 118 as well as to limit a maximum stroke of slip joint 110. To counteract translational movement (in addition to heave) of drilling platform 100, an arrangement of mooring lines (not shown) may be used to retain drilling platform 100 in a substantially constant longitudinal and latitudinal area.

As shown, slip joint 110 is constructed as a three-piece slip joint having a lower section 122, an upper section 124, and a seal housing 126. In operation, upper section 124 plunges into lower section 122 similar to a piston into a bore while seal housing 126 maintains a fluid seal between two sections 122, 124. Thus, riser assembly 106 may be constructed such that diverter assembly 108 may be rigidly affixed relative to rig floor 100 and with riser string 118 rigidly affixed to the subsea wellhead below. Therefore, the heave and movement of drilling platform 100 relative to the subsea wellhead is taken up by slip joint 110 and hydraulic member 120. Furthermore, it should be understood that at long lengths, riser string 118 will exhibit relative flexibility and thus will allow for additional movement of drilling platform 100 relative to location of the subsea wellhead.

In certain operations including, but not limited to MPD operations, riser assembly 106 may be required to handle high annular pressures. However, components such as diverter assembly 108 and slip joint 110 are typically not constructed to handle the elevated annular fluid pressures associated with managed pressure drilling. Therefore, in selected embodiments, components in an upper portion of riser assembly 106 are isolated from the elevated annular pressures experienced by components located in a lower portion of riser assembly 106. Thus, rotating control device 112 may be included in riser assembly 106 between riser string 118 and slip joint 110 to rotatably seal about a drillstring (not shown) and prevent high pressure annular fluids in riser string 118 from reaching slip joint 110, diverter assembly 108, and the environment.

In one embodiment, rotating control device 112 may be capable of isolating pressures in excess of 1,000 psi while rotating (i.e., dynamic) and 2,000 psi when not rotating (i.e., static) from upper portions of riser assembly 106. While annular blowout preventer 114 may be capable of similarly isolating annular pressure, such annular blowout preventers are not intended to be used when the drillstring is rotating, as would occur during an MPD operation.

Figure 2:
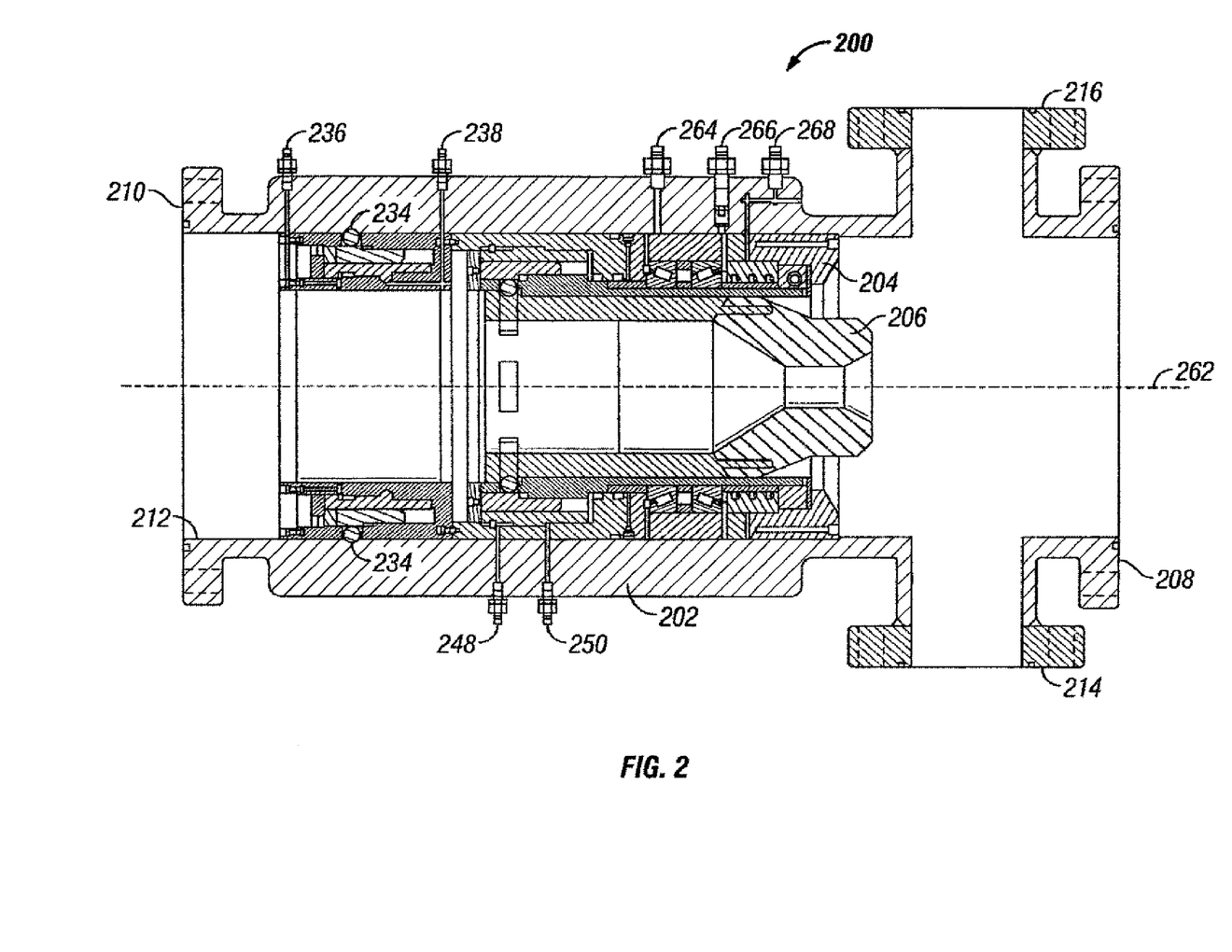
FIG. 2 is a section-view drawing of a rotating control device in accordance with embodiments of the present disclosure.

Referring now to FIG. 2, a rotating control device ("RCD") 200 is shown in an assembled state. In one embodiment, RCD 200 is composed of a housing 202, a bearing package 204, and a packing element 206. Housing 202 includes a lower connection 208 and an upper connection 210 to the remainder of a riser assembly (e.g., the slip joint 110 of FIG. 1), an inner bore 212, and a pair of outlet flanges 214, 216. Outlet flanges 214, 216 may be useful in managing annular pressure below RCD 200, but one of ordinary skill in the art will understand that they are not necessary to the functionality of RCD 200. Particularly, outlet flanges 214, 216 may be relocated to other components of the riser assembly if desired. Furthermore, flange connections 208 and 210 may be of any particular type and configuration, but should be selected such that RCD 200 may sealingly mate with adjacent components of the riser assembly.

Figure 3:
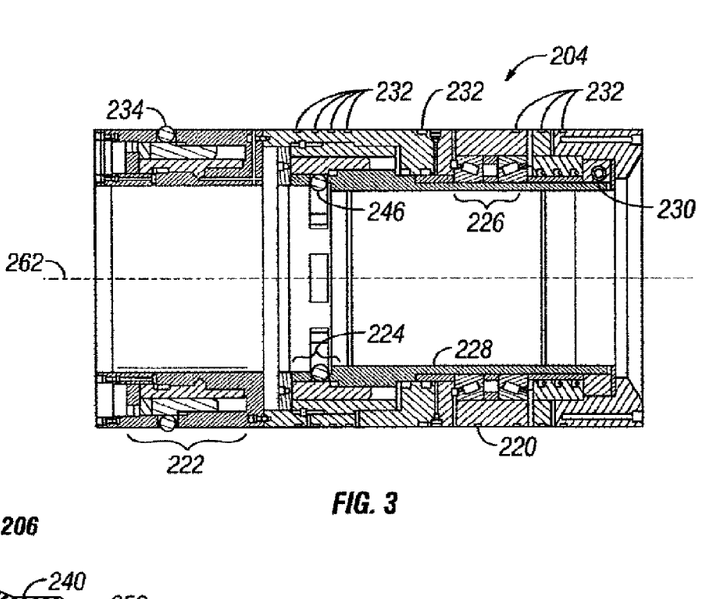
FIG. 3 is a section-view drawing of a bearing package of the rotating control device of FIG. 2.

Referring now to FIGS. 2 and 3 together, bearing package 204 is engaged within bore 212 of RCD 200. As shown, bearing package 204 includes a outer housing 220, a first locking assembly 222 to hold bearing package 204 within housing 202 of RCD 200, and a second locking assembly 224 to hold packing element 206 within bearing package 204. Furthermore, bearing package 204 includes a bearing assembly 226 to allow an inner sleeve 228 to rotate with respect to outer housing 220 and a seal 230 to isolate bearing assembly 226 from wellbore fluids. A plurality of seals 232 are positioned about the periphery of outer housing 220 so that bearing package 204 may sealingly engage inner bore 212 of housing 202. While seals 232 are shown to be O-ring seals about the outer periphery of bearing package 204, one of ordinary skill in the art will appreciate than any type of seal may be used.

Once engaged, first locking assembly 222 is hydraulically engaged such that a plurality of locking lugs 234 may engage a corresponding groove (e.g., item 992 of FIG. 9) within inner bore 212 of housing 202. As shown in the assembled state in FIG. 2, two hydraulic ports, a clamp port 236 and an unclamp port 238 act through housing 202 to selectively engage and disengage locking lugs 234 into and from the groove of inner bore 212. One such clamping mechanism that may be used to secure bearing package 204 within housing 202 is described in detail in U.S. Pat. No. 5,022,472, identified and incorporated by reference above. However, one of ordinary skill in the art will understand that any clamping mechanism may be used to retain bearing package 204 within housing 202 without departing from the scope of the claimed subject matter. Particularly, various mechanisms including, but not limited to, electromechanical, hydraulic, pneumatic, and electromagnetic mechanisms may be used for first and second locking assemblies 222, 224.

Furthermore, as should be understood by one of ordinary skill in the art, bearing assembly 226 may be of any type of bearing assembly capable of supporting rotational and thrust loads. As shown in FIGS. 2 and 3, bearing assembly 226 is a roller bearing comprising two sets of tapered rollers. Alternatively, ball bearings, journal bearings, tilt-pad bearings, and/or diamond bearings may be used with bearing package 204 without departing from the scope of the claimed subject matter. One example of a diamond bearing that may be used in conjunction with bearing package 204 may be seen in U.S. Pat. No. 6,354,385, identified and incorporated by reference above.

Figure 4:
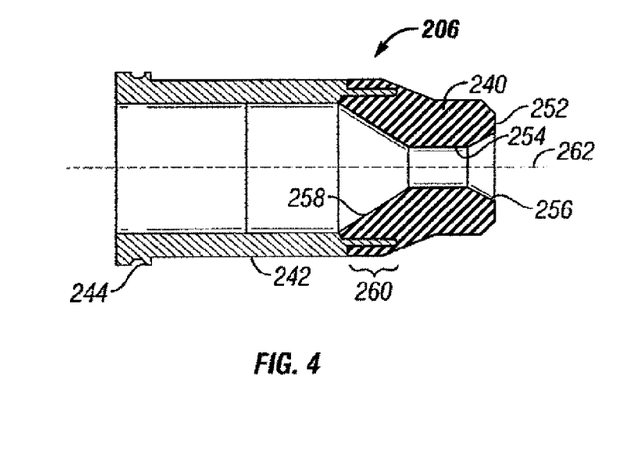
FIG. 4 is a section-view drawing of a packing element of the rotating control device of FIG. 2.

Referring now to FIGS. 2, 3, and 4 together, packing element 206 is engaged within bearing package 204. As shown, packing element 206 includes a stripper rubber 240 and a housing 242. While a single stripper rubber 240 is shown, one of ordinary skill would understand that more than one stripper rubber 240 may be used. Housing 242 may be made of high-strength steel and include a locking profile 244 at its distal end that is configured to receive a plurality of locking lugs 246 from second locking assembly 224 of bearing package 204. Similar to first locking assembly 222, second locking assembly 224 retains packing element 206 within bearing package 204 (which, in turn, is locked within housing 202 by first locking assembly 222) when pressure is applied to a second hydraulic clamping port 248. Similarly, when packing element 206 is to be retrieved from bearing assembly 204, pressure may be applied to second hydraulic unclamping port 250 to release locking lugs 246 from locking profile 244.

Referring now to FIG. 4, the stripper rubber 240 is constructed so that threaded tool joints of a drillstring (not shown) may be passed therethrough when hydraulic pressure is experienced at a distal end 252 of stripper rubber 240. As such, stripper rubber 240 includes a through bore 254 that is selected to sealingly engage the size of drill pipe that is to be engaged through RCD 200. Further, to accommodate the passage of larger diameter tool joints therethrough during a drillstring tripping operation, stripper rubber 240 may include tapered portions 256 and 258. Furthermore, stripper rubber 240 may include upset portions 260 on its outer periphery to effectively seal stripper rubber 240 with inner sleeve 228 of bearing package 204, such that high pressure fluids may not bypass packing element 206.

Still referring to FIGS. 2-4, hydraulic lubricant flowing through a pair of ports 264, 266 may communicate with and lubricate bearing assembly 226. Furthermore, a hydraulic port 268 allows hydraulic fluid to bias seal 230 of bearing package 204 against pressures in the riser assembly. Thus, as assembled, stripper rubber 240 seals around the drillstring and prevents high-pressure fluids from passing between packing element 206 and bearing package 204. Seal 230 prevents high-pressure fluids from invading and passing through bearing assembly 226, and seals 232 prevent high-pressure fluids from passing between housing 202 and bearing package 204. Therefore, when packing element 206 is installed within bearing package 204 which is, in turn, installed within housing 202, a drillstring may engage through RCD 200 along a central axis 262 such that high-pressure annular fluids between the outer profile of the drillstring and the inner bore of riser string (e.g., 118 of FIG. 1) are isolated from upper riser assembly components.

Figure 5:
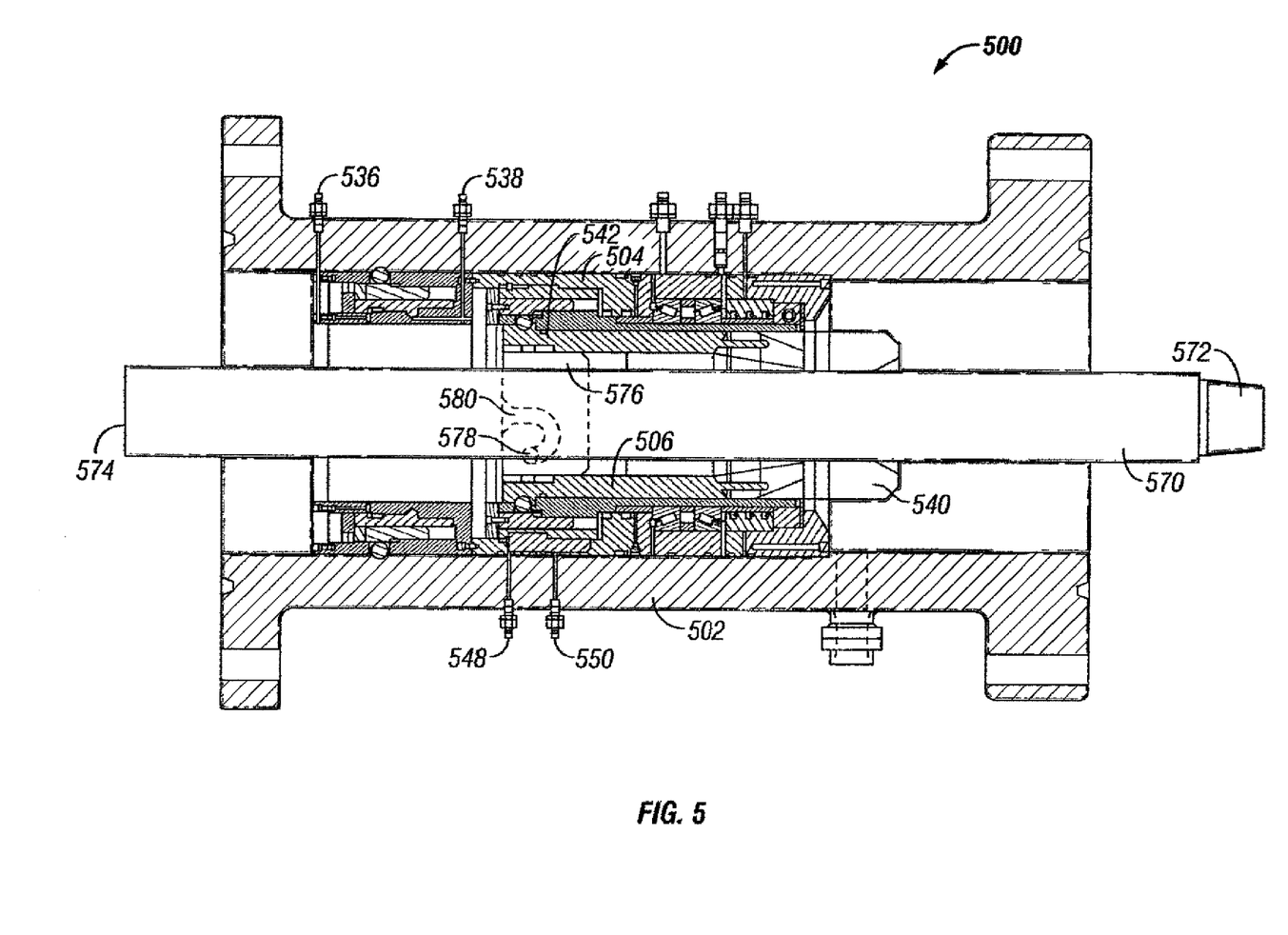
FIG. 5 depicts a running tool to install or retrieve a packing element of a rotating control device in accordance with embodiments of the present disclosure.
Figure 6:
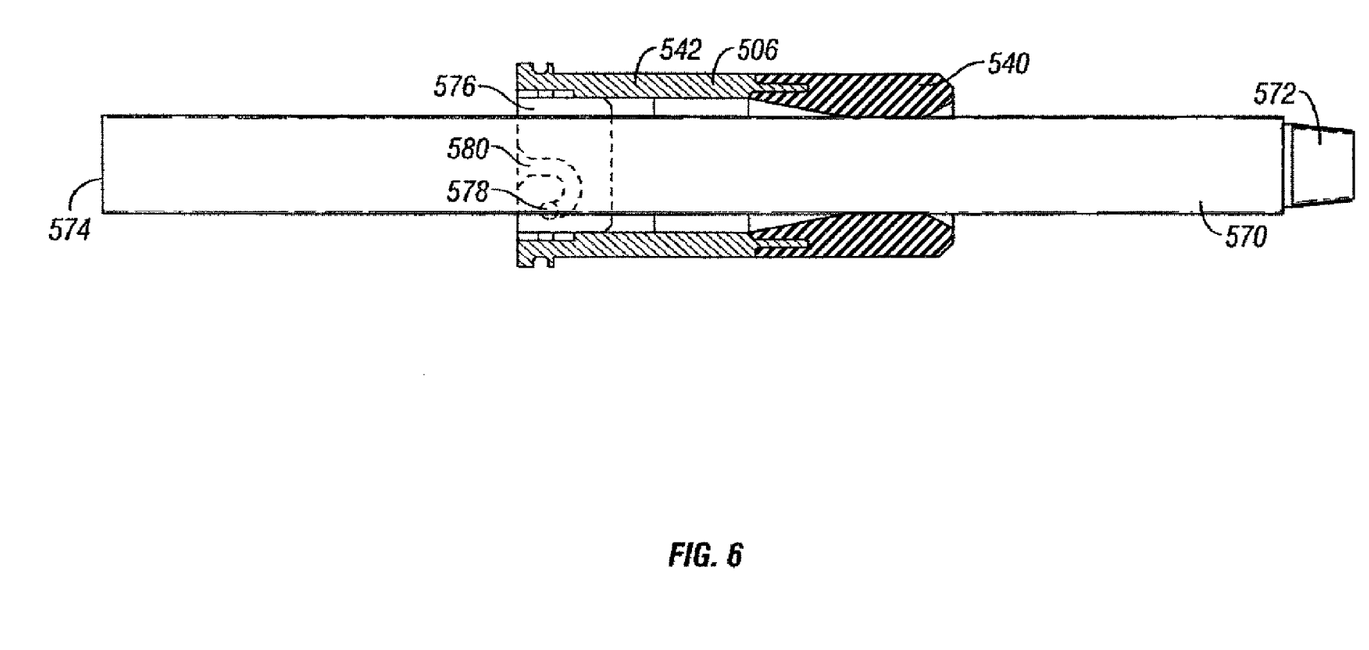
FIG. 6 is the running tool of FIG. 5 shown retaining a packing element.

Referring now to FIGS. 5 and 6, the removal of a packing element 506 from a bearing package 504 and a housing 502 of an installed RCD 500 will be described. After extended periods of use, stripper rubber 540 of packing element 506 may become worn and require replacement. To retrieve packing element 506, a running tool 570 may be connected in-line with the drillstring at threaded connections 572 and 574 and run down the riser assembly until RCD 500 is reached. Once reached, an outer mandrel 576 may engage a corresponding profile of the inner bore of seal housing 542 so that packing element 506 may be locked onto running tool 570. In the embodiment shown in FIGS. 5 and 6, running tool 570 includes a pin member 578 that locks into a J-slot profile 580 on inner portion of seal housing 542. One of ordinary skill in the art will appreciate that numerous other locking profiles may be used to attach packing element 506 to running tool 570.

With running tool 570 locked in engagement with packing element 506, pressure may be applied to unclamping port 550 to release packing element 506 from bearing package 504. If packing element 506 is being used to resist annular pressure in the riser assembly, an annular blowout preventer (e.g., 114 of FIG. 1) may be activated to seal around the drillstring before packing element 506 is released from bearing package 504. With packing element 506 released, the drillstring may be lifted out of the riser assembly until packing element 506 and running tool 570 reach the rig floor (102 of FIG. 1). Once at the rig floor, packing element 506 may be replaced and the process reversed to re-install packing element 506. Once re-positioned within bearing package 504, hydraulic pressure may be applied to clamping port 548 to re-lock packing element 506 within bearing package 504.

Alternatively, packing element 506 may be removed more quickly by merely applying hydraulic pressure to unclamping port 550 and lifting packing element 506 out with the bare drillstring. Because tool joints of a traditional drillstring are larger in diameter than the remainder of drill pipe sections, rather than expand and pass through stripper rubber 540, tool joints of the drillstring may instead "pull" packing element 506 up with the drillstring as it is retrieved. Using this method, running tool 570 may be prepped with a new packing element 506 on the rig floor while the old packing element is retrieved, thereby saving time without the need for stocking two running tools 570 on the rig site.

Alternatively still, in addition to retrieving only packing element 506, running tool 570 may similarly be used to retrieve packing element 506 and bearing package 504 together at the same time. Often, bearing package 504 may require service at the same time packing element 506 requires replacement. Furthermore, rather than run two separate retrieval operations, the entire bearing package 504 and packing element 506 may be retrieved more quickly if RCD 500 is no longer needed in the drilling operations. Particularly, once MPD operations are complete (or halted), retrieving the entire bearing package 504 and packing element 506 allows a larger clearance through the entire riser assembly from diverter assembly (108 of FIG. 1) through sections of riser pipe through riser pipe sections (118 of FIG. 1) to the subsea wellhead in case a large-diameter bit or drilling tool is required to pass therethrough.

Similarly, as described above in reference to the removal of packing element 506, bearing package 504 and packing element 506 may be retrieved together by applying hydraulic pressure to an unclamping port 538 of RCD housing 502. It should be noted that pressure should not be applied to unclamping port 550 if bearing package 504 and packing element 506 are to be retrieved together. Ideally, clamp mechanisms (e.g., 222 and 224 of FIG. 2) are designed as steady state mechanisms, meaning that the clamp mechanisms do not require constant pressure to their clamping ports 536, 548 to maintain locking engagement. As such, the clamping mechanisms may be configured to remain clamped until pressure is applied to unclamping ports 538 and/or 550, and may be configured to remain unclamped until pressure is applied to clamping ports 536 and/or 548. As such, bearing package 504 may be removed together with packing element 506 without concern that bearing package 504 may become dislodged and lost during the removal operation.

Figure 7:
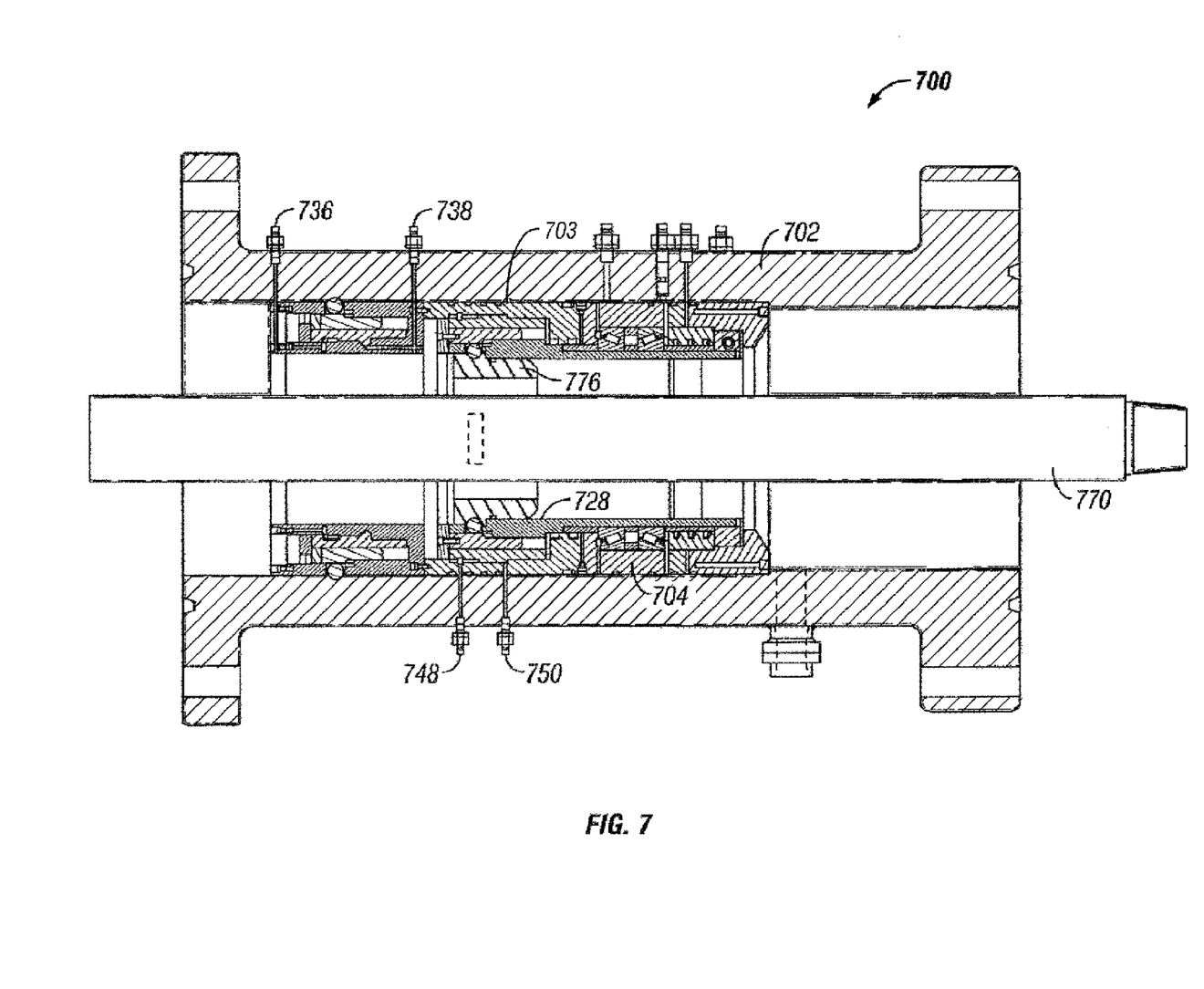
FIG. 7 depicts a running tool to install or retrieve a bearing package of a rotating control device in accordance with embodiments of the present disclosure.
Figure 8:
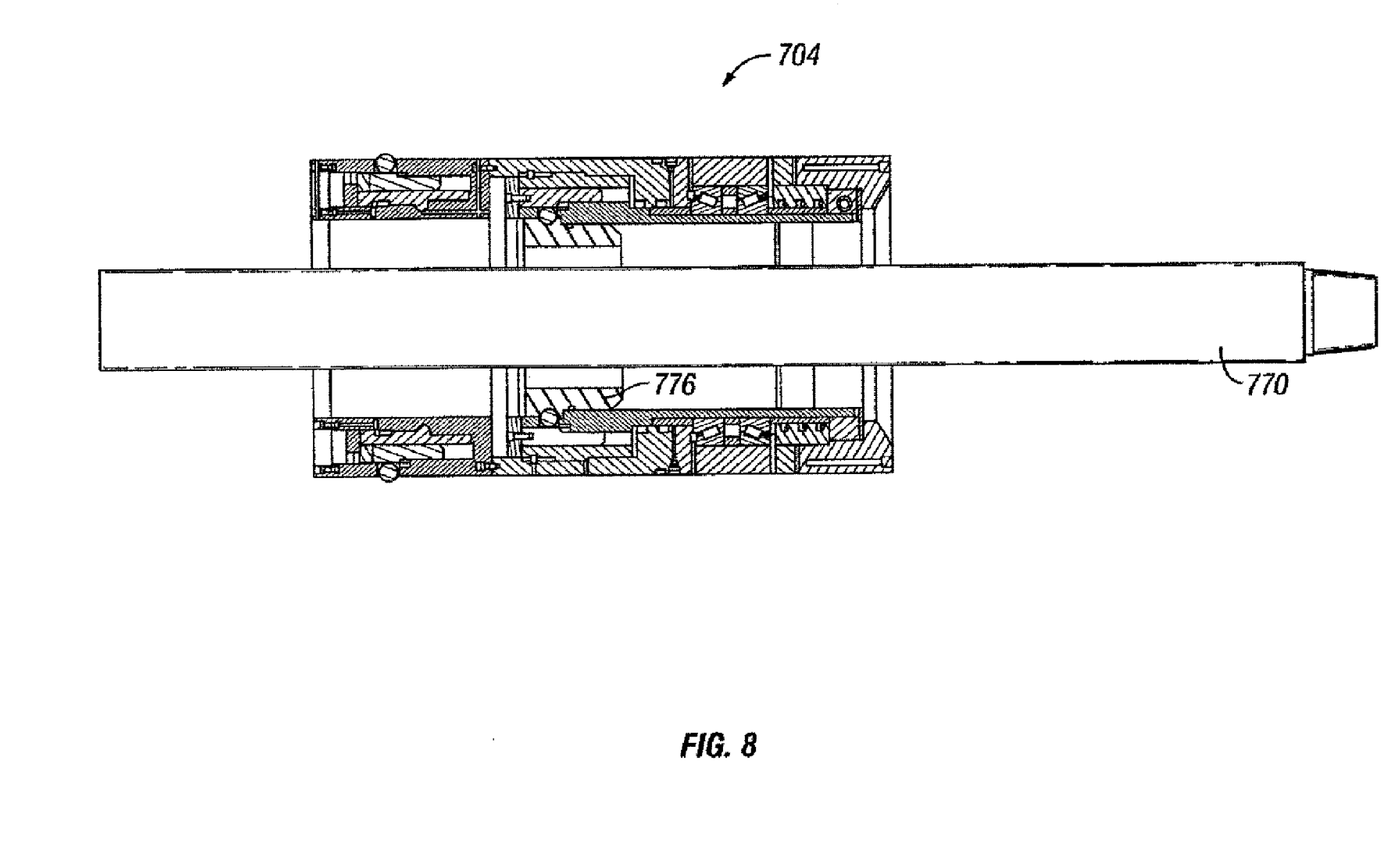
FIG. 8 is the running tool of FIG. 7 shown retaining a bearing package.

Referring now to FIGS. 7 and 8, the removal of a bearing package 704 from a housing 702 of an installed RCD 700 will be described. In FIG. 7, the packing element (e.g., 506 of FIGS. 5-6) has already been removed and a running tool 770 is deployed to retrieve bearing package 704 from RCD housing 702. As such, running tool 770 is constructed similar to running tool 570 of FIGS. 5-6, with the exception that an outer mandrel 776, configured to be received by the packing element clamp (e.g., 224 of FIG. 3), is run with tool 770. In order to conserve space on the drilling rig, one tool may be constructed to function as both running tool 570 of FIGS. 5-6 and running tool 770 of FIGS. 7-8. One of ordinary skill in the art will be able to appreciate a single tool 570, 770 having interchangeable outer mandrels 576, 776 that are selectable based upon what components are to be retrieved from RCD 500, 700.

Nonetheless, running tool 770 includes an outer mandrel 776 configured to be received and locked into the clamp that would otherwise retain the packing element. As such, running tool 770 is deployed to RCD 700 along the drillstring until outer mandrel 776 engages inner sleeve 728 of bearing package 704. Once in position, hydraulic pressure is applied to clamping port 748 of RCD 700 to secure outer mandrel 776 of running tool 770 to bearing package 704. Once secured, hydraulic pressure may be applied to unclamping port 738 of RCD 700 to release bearing package 704 from housing 702. Once released, running tool 770, carrying bearing package 704, may be lifted out of the riser assembly through a slip joint and a diverter assembly (110 and 108 of FIG. 1, respectively) en route to the rig floor. Once at the rig floor, the bearing package may be serviced and/or repaired, or put away for future use. Re-installation of bearing package 704 will follow the inverse of the above-identified procedure, with the exception that clamping port 736 and unclamping port 750 will be energized upon installation to lock bearing package 704 in place and release running tool 700.

Figure 9:
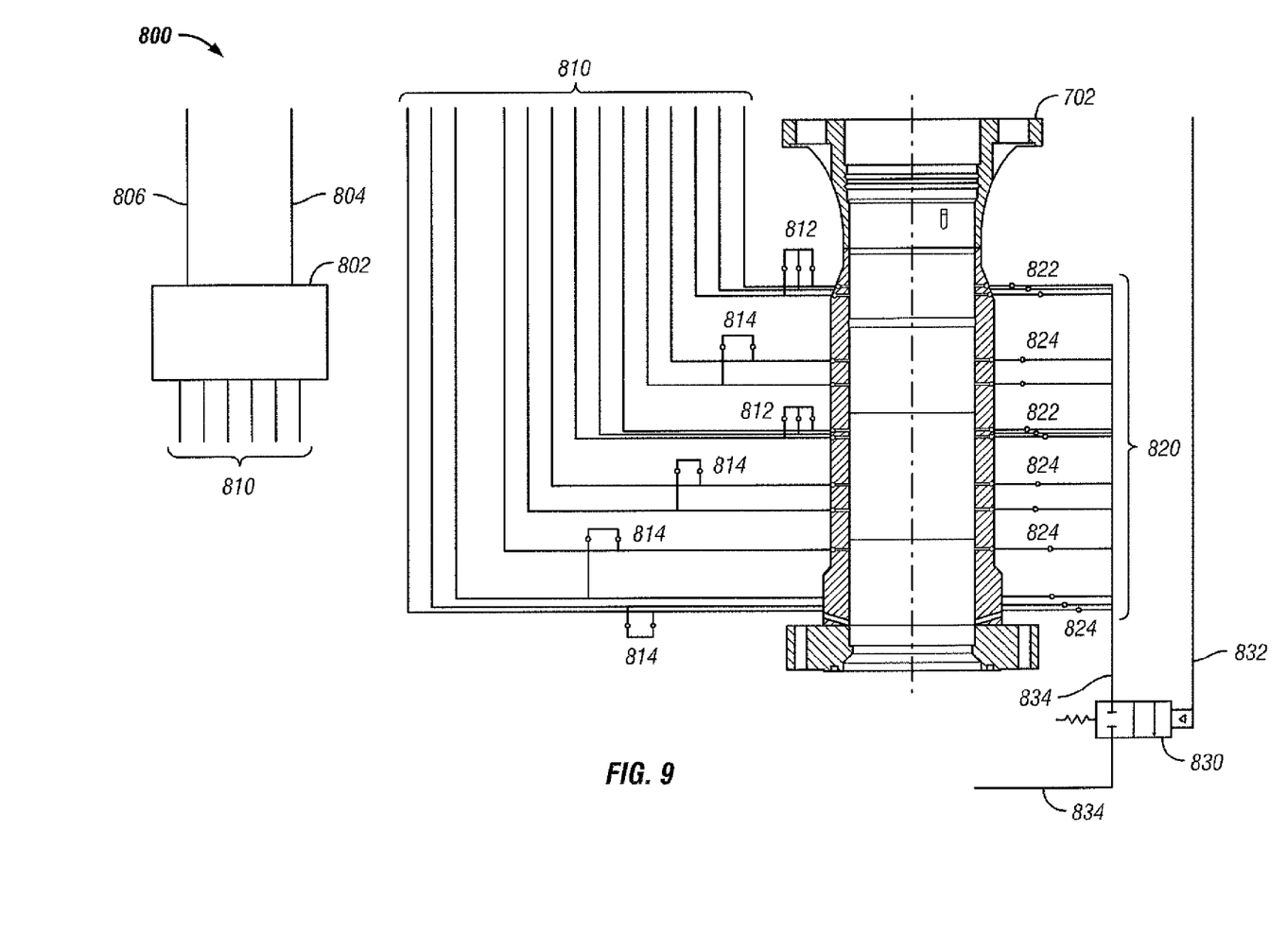
FIG. 9 is a schematic view of a flushing system used with the rotating control device in accordance with embodiments of the present disclosure.

Referring now to FIG. 9, a schematic of a flushing system 800 integrated with RCD 700 (FIG. 7) is shown in accordance with embodiments of the present disclosure. Flushing system 800 may be used upon reinstallation of bearing package 704 (FIG. 7) into main housing 702. Flushing system 800 includes a flushing block 802 into which a separate main air inlet line 804 and a main hydraulic oil inlet line 806 are run. Flushing block 802 is configured to route either hydraulic oil and/or air to various hydraulic and pneumatic inlet lines 810 connected to corresponding hydraulic and pneumatic ports of main housing 702. As shown, flushing system 800 includes multiple pneumatic lines 812 and multiple hydraulic lines 814. While a certain number of pneumatic lines 812 and hydraulic lines 814 are shown here, one of ordinary skill in the art will be familiar with numerous different arrangements of hydraulic lines 814 and/or pneumatic lines 812. Further, flushing system 800 includes multiple corresponding outlet lines 820 for both the hydraulic 824 lines and pneumatic lines 822 connected to main housing 702. The outlet lines 820 are merged into a single disposal line 834, which is configured to carry fluid from the outlet lines 820 and dispose the fluid into the wellbore (not shown), below main housing 702. Fluid flow through disposal line 834 may be controlled with a valve 830 (e.g., a ball valve), the valve being operated through with line 832 (e.g., an air pilot line to operate a ball valve).

Referring back to FIG. 7, during operation of RCD 700 (FIG. 7), a column of wellbore fluid is typically present in the wellbore, including in a bore of the bearing package 704 when installed in RCD 700. After removal of bearing package 704 from RCD 700, the column of wellbore fluid flows to occupy the volume previously occupied by the now removed bearing package 704. As such, when bearing package 704 is reinstalled into main housing 702, it is installed into this column of wellbore fluid (not shown). While reinstallation of the bearing package 704 may displace some of the wellbore fluid, wellbore fluid may still remain in a small annulus 703 formed between an outer surface of the bearing package 704 and an inner surface of main housing 702. Wellbore fluid may be detrimental to proper operation of the bearing package 704 by contaminating hydraulic and pneumatic ports of the bearing package 704. Embodiments disclosed herein provide a method, using the flushing system described above, to remove the wellbore fluid from the rotating control device.

Prior to reinstalling the bearing package 704 into the main housing 702, burst discs or other obstructive devices (not shown) may be fitted in the hydraulic and pneumatic ports of the bearing package 704 to prevent wellbore fluid from entering the bearing package 704. Burst discs (not shown) are configured to obstruct a port and resist fluid at a lower pressure, and then fail or burst at a pre-set higher pressure to allow fluid to flow through the previously obstructed port. When used during the bearing package reinstallation, the burst discs are configured to withstand a lower pressure during a flushing procedure to be described, and subsequently fail after the flushing procedure has ended to allow either hydraulic oil or air to enter the ports of the bearing package.

Referring again to FIG. 9, a hydraulic oil flushing procedure may be employed to flush the wellbore fluid out of the annulus 703 (FIG. 7) after the bearing package 704 is installed. Hydraulic oil is routed through hydraulic oil inlet line 806 and into flushing block 802 (i.e., a manifold), where the hydraulic oil is then routed to all inlet lines 810 (both hydraulic 814 and pneumatic 812) and into the main housing 702 at a pressure of between 200 and 300 psi, thereby flushing wellbore fluid out of the annulus. Wellbore fluid that is flushed from the annulus in the main housing 702 may be routed into outlet lines 820, where the wellbore fluid ultimately is collected in disposal line 834 and released downhole of the RCD 700 into the wellbore. In certain embodiments, the hydraulic oil flushing procedure may be run for a set amount of time to ensure that all of the wellbore fluid is removed from the main housing 702. In certain embodiments, the hydraulic oil flushing procedure may be run between 15 minutes and 30 minutes. However, one of ordinary skill in the art will understand that the hydraulic oil flushing procedure may be run for a shorter period or a longer period depending on the application. After the hydraulic oil flushing procedure is completed (i.e., all wellbore fluid has been removed from the annulus or after predetermined flushing period has expired), the burst discs in the ports of the bearing package may be burst or cracked by increasing the pressure of the hydraulic oil into the main housing to about 500 psi. When the burst discs are cracked, the obstruction in the hydraulic and pneumatic ports of the bearing package 704 is removed to allow hydraulic fluid to enter the bearing package 704 as needed.

Further, after the hydraulic oil flushing procedure is complete, the main hydraulic oil inlet line 806 may be disconnected and the main air inlet line 804 may be connected. An arrangement of shuttle valves (not shown) of flushing system 800, which are configured to route air only through pneumatic inlet lines 812 to pneumatic ports of the bearing package 704, may be operated so that air flows through the pneumatic ports of the bearing package 704. Air is routed through the pneumatic ports (at about 100 psi) of the bearing package 704 to remove hydraulic fluid previously used during the hydraulic oil flushing procedure. Hydraulic fluid may be forced out of the main housing 702 and bearing package 704 under air pressure through outlet lines 820 and into the wellbore. With wellbore fluid removed from the main housing, and hydraulic oil used in the hydraulic oil flushing procedure removed from the pneumatic ports, the bearing package is operational and use of the rotating control device may recommence.

Advantageously, bearing package (e.g., 204, 504, and 704) is constructed of such size and geometry that it may be retrieved through an upper portion of the riser assembly without necessitating the disassembly of the riser assembly. Furthermore, removing the bearing package and packing element from the RCD housing allows a drilling operator to have full-bore access to the riser assembly below. It is not necessary for an RCD assembly (e.g., 112, 200, 500, and 700) to be present in the riser assembly under all drilling conditions. Under drilling operations having low annular pressures in the riser assembly, the added wear components of the RCD assembly are not necessary and are costly to maintain. However, because bearing packages and packing elements of RCDs in accordance with embodiments of the present disclosure may be quickly retrieved and replaced, it may be beneficial to install an RCD housing (e.g., 202, 502, and 702) in a riser assembly in case that a future use of an RCD is required. The housing for an RCD may be installed for every drilling riser and the bearing package and packing element installed when use of an RCD is required. However, because the internal bore of RCD housings are seal surfaces upon which seals about the bearing package must seal, a bore protector may be installed thereto when the RCD is no longer required.

Figure 10:
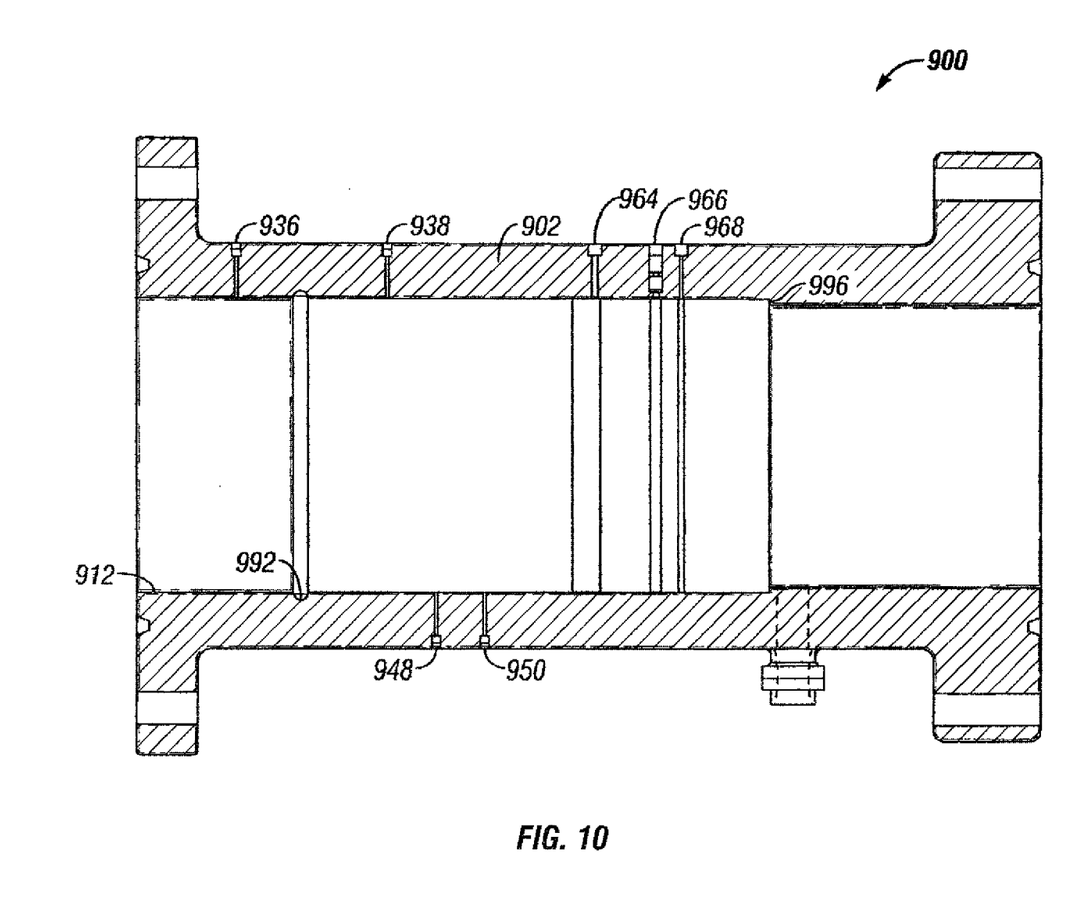
FIG. 10 is a housing of a rotating control device in accordance with embodiments of the present disclosure.
Figure 11:
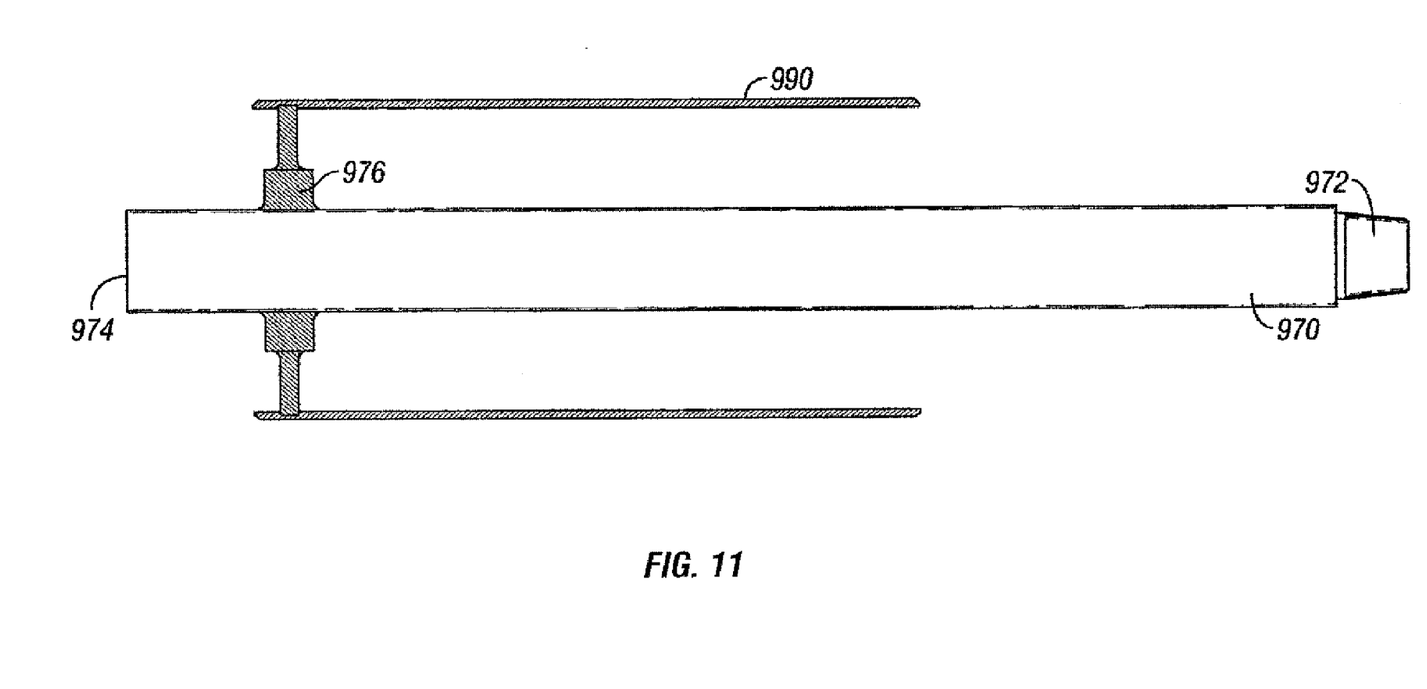
FIG. 11 depicts a running tool to install or retrieve a protective sleeve of a rotating control device in accordance with embodiments of the present disclosure.
Figure 12:
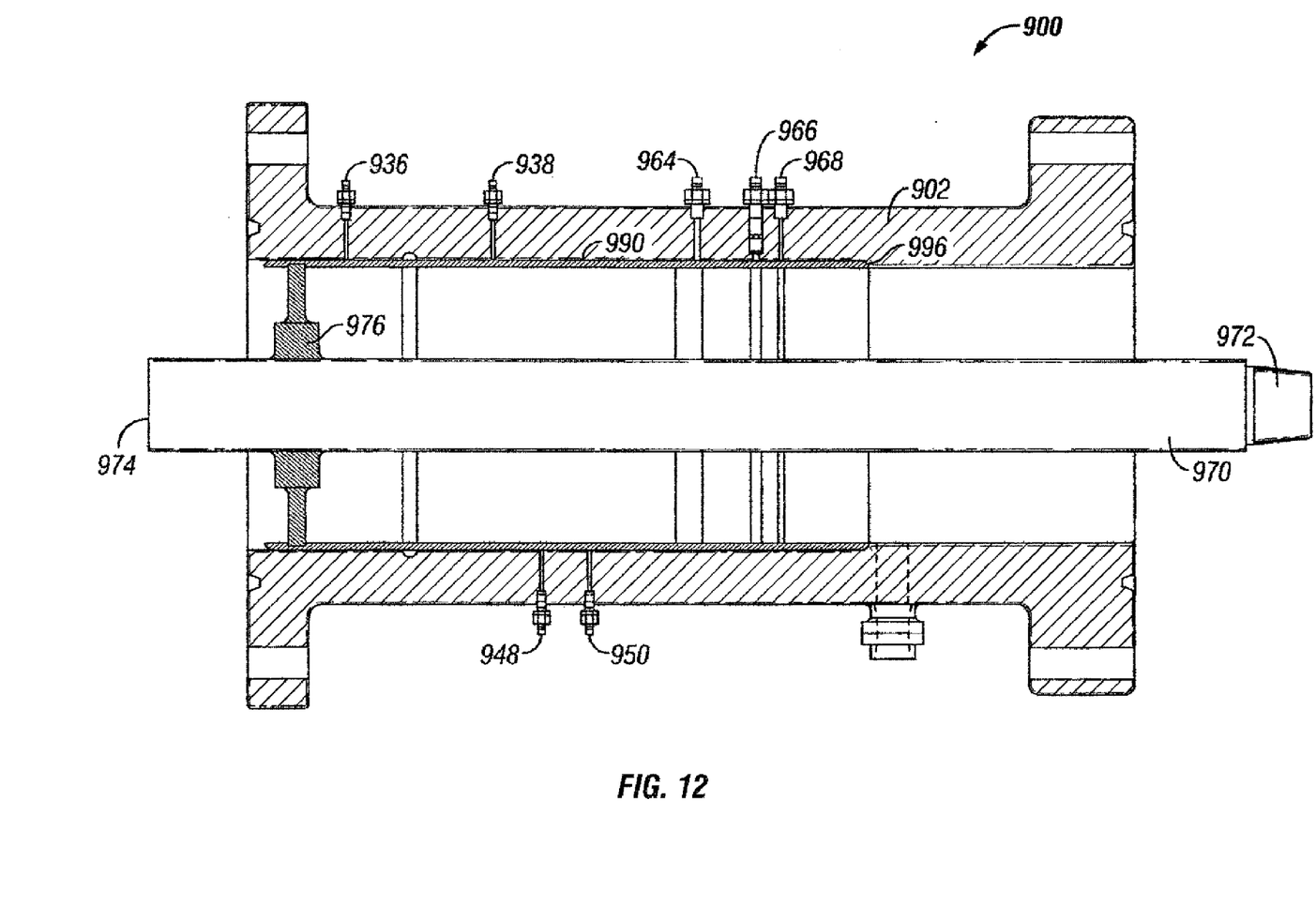
FIG. 12 depicts the running tool of FIG. 11 installing a protective sleeve into the rotating control device of FIG. 10.

Referring now to FIGS. 9-11 together, the installation of a protector sleeve 990 into a housing 902 of an RCD 900 will be described. In FIG. 9, an RCD housing 902 is shown having an exposed inner bore 912. With the bearing package (e.g., 204, 504, and 704) and packing element (e.g., 206 and 504) removed, inner bore 912 is exposed and susceptible to damage. As such, unclamping and clamping ports (938, 950, 936, and 948), bearing lubrication ports 964, 966, seal biasing port 968, and a locking ball groove 992 are exposed to the harsh drilling environment. Because future functionality of these components may be of importance to the drilling operator, protective sleeve 990 may be provided and installed to housing 902 to cover these ports. Referring to FIG. 10, protective sleeve 990 is shown attached to a running tool 970 for delivery to RCD housing 902 upon a drillstring attached to threaded connections 972 and 974. As such, running tool 970 includes an outer mandrel 976 configured to secure protective sleeve 990 for delivery and retrieval.

As described above in reference to running tools 770 and 570, the mechanism for securing protective sleeve 990 to outer mandrel 976 may be any of many securing mechanisms known to one of ordinary skill in the art. However, as shown in FIGS. 9-11, the securing mechanism may include a J-slot milled into an inner portion of protective sleeve 990. As such, following delivery of sleeve 990 to housing 902, running tool 970 may be rotated and retrieved, leaving sleeve 990 to protect inner bore 902 of housing 912 as shown in FIG. 11. As no locking mechanism is used (or required) for protective sleeve 990, running tool 970 may engage sleeve 990 into housing 902 until sleeve 990 engages a load shoulder 996 of housing 902. Similarly, protective sleeve 990 may be retrieved by performing the installation steps in reverse.

While protective sleeve is disclosed herein as a simple sleeve requiring no locking mechanism, it should be understood by one of ordinary skill in the art that a locking mechanism to more securely retain protective sleeve may be used. Furthermore, as the RCD housing may be intended to be delivered without a bearing package and packing element, it may come with a protective sleeve pre-installed. Furthermore, as described above, running tool 970 may be the same running tool (570 and 770) used to retrieve and replace bearing packages and packing elements. As such, outer mandrel 976 may be interchangeable with outer mandrels 576 and 776, thereby reducing the amount of support equipment that must be carried and maintained by crew of the offshore drilling platform.

Advantageously, RCDs (e.g., 112, 200, 500, 700, and 900) disclosed in embodiments of the present disclosure have the ability to have their packing elements (e.g., 206, 506) removed and replaced without the need to disassemble components of the riser assembly. Benefits of such a removal and replacement operation may include time and cost savings, wherein a running tool (e.g., 570, 770, and 970) threadably coupled to a drillstring may be able to retrieve and replace packing element 506 in significantly less time than would be required to partially disassemble and reassemble a riser assembly. Furthermore, if a packing element (e.g., 206 and 506) requires removal and/or replacement while high pressures are present in the riser assembly, embodiments in accordance with the present disclosure may allow the retrieval and replacement of packing element 506 without de-pressurizing the annulus of the riser assembly.

Further, methods of flushing disclosed in embodiments herein may be advantageous because of the ability to substantially or completely remove the wellbore fluid from the main housing of the rotating control device when the bearing package is reinstalled. Methods disclosed herein provide removal of the wellbore fluid, which may prevent possible blockage of communication of the hydraulic and pneumatic systems. Blockage of hydraulic and pneumatic lines may lead to failure of the rotating control device, costing time and money to an operator. Further, remnants of wellbore fluid in the bearing package may promote corrosion of the components. Removal of the wellbore fluid with the flushing procedure provided by embodiments disclosed herein prevents such corrosion by removing the wellbore fluid.

While the present disclosure has been described with respect to a limited number of embodiments, those skilled in the art, having benefit of this disclosure, will appreciate that other embodiments may be devised which do not depart from the scope of the present disclosure. Accordingly, the scope of the present disclosure should be limited only by the attached claims.

What is claimed is:

1. A method of flushing a wellbore fluid from a downhole tool containing a bearing package, the method comprising:
   pumping hydraulic oil from a flushing block through at least one hydraulic inlet line and at least one pneumatic inlet line connected to a main housing and into an annulus formed between the bearing package and the main housing of the downhole tool, wherein the hydraulic oil replaces the wellbore fluid in the annulus;
   removing the wellbore fluid from the annulus through at least one hydraulic outlet line and at least one pneumatic outlet line connected to the main housing;
   pumping air from the flushing block through the at least one pneumatic inlet line connected to the main housing and removing the hydraulic oil from the at least one pneumatic inlet line connected to the main housing; and removing the hydraulic oil through at least one pneumatic outlet line connected to the main housing.

2. The method of claim 1, further comprising obstructing at least one hydraulic port and at least one pneumatic port of the bearing package before pumping the hydraulic oil.

3. The method of claim 2, further comprising removing the obstruction from the at least one hydraulic port and the at least one pneumatic port of the bearing package after pumping the hydraulic oil.

4. The method of claim 3, wherein pumping the hydraulic oil at a pressure of about 500 psi removes the obstruction from the at least one hydraulic port and the at least one pneumatic port of the bearing package.

5. The method of claim 1, further comprising routing the wellbore fluid out of the at least one hydraulic outlet line and the at least one pneumatic outlet line and into the wellbore downhole of the downhole tool.

6. The method of claim 1, wherein the downhole tool comprises a rotating control device.

7. The method of claim 1, wherein the hydraulic oil is pumped at a pressure of between about 200 and 300 psi.

8. The method of claim 1, wherein the air is pumped at a pressure of about 100 psi.

9. The method of claim 1, wherein pumping the hydraulic fluid continues until all of the wellbore fluid is removed from the annulus.

10. A flushing system for removing a wellbore fluid from a downhole tool containing a bearing package, the flushing system comprising:
   a flushing block into which a main hydraulic oil inlet line and a main air inlet line are routed;
   at least one hydraulic inlet line connected to a main housing of the downhole tool and at least one hydraulic outlet line connected to a main housing of the downhole tool; and
   at least one pneumatic inlet line connected to the main housing of the downhole tool and at least one pneumatic outlet line connected to the main housing of the downhole tool;
   wherein the flushing block is configured to route hydraulic oil to the at least one hydraulic inlet line and to the at least one pneumatic inlet line.

11. The flushing system of claim 10, further comprising a disposal line, wherein the wellbore fluid from the at least one hydraulic outlet line and the at least one pneumatic outline line is routed.

12. The flushing system of claim 11, further comprising a valve configured to control fluid flow through the disposal line.

13. The flushing system of claim 10, wherein an obstructing device is installed in at least one hydraulic port and at least one pneumatic port of the bearing package to prevent the wellbore fluid from entering the at least one hydraulic port and the at least one pneumatic port.

14. The flushing system of claim 10, wherein the flushing block is configured to provide air from the main air inlet line to the at least one pneumatic inlet line.

15. The flushing system of claim 10, further comprising a shuttle valve configured to route air from the main air inlet line only through the at least one pneumatic inlet line to the main housing.

\* \* \* \* \*